(12) United States Patent
Bamji

(10) Patent No.: US 8,194,233 B2
(45) Date of Patent: Jun. 5, 2012

(54) METHOD AND SYSTEM TO REDUCE STRAY LIGHT REFLECTION ERROR IN TIME-OF-FLIGHT SENSOR ARRAYS

(75) Inventor: Cyrus Bamji, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/384,949

(22) Filed: Apr. 10, 2009

(65) Prior Publication Data

US 2012/0008128 A1    Jan. 12, 2012

Related U.S. Application Data

(60) Provisional application No. 61/124,104, filed on Apr. 11, 2008, provisional application No. 61/203,599, filed on Dec. 26, 2008.

(51) Int. Cl.
  *G01C 3/08* (2006.01)
(52) U.S. Cl. ......................... 356/5.01; 356/5.1; 356/5.15
(58) Field of Classification Search ................. 356/4.01, 356/5.01, 5.09, 5.1
  See application file for complete search history.

(56) References Cited

U.S. PATENT DOCUMENTS

| | | | |
|---|---|---|---|
| 6,741,335 B2* | 5/2004 | Kinrot et al. | 356/28 |
| 7,554,652 B1* | 6/2009 | Babin et al. | 356/5.03 |
| 2006/0176467 A1* | 8/2006 | Rafii et al. | 356/4.07 |
| 2007/0263203 A1* | 11/2007 | Typpo et al. | 356/4.03 |

* cited by examiner

*Primary Examiner* — Thomas Tarcza
*Assistant Examiner* — Luke Ratcliffe
(74) *Attorney, Agent, or Firm* — Vierra Magen Marcus & DeNiro LLP

(57) ABSTRACT

Haze-type phase shift error due to stray light reflections in a phase-type TOF system is reduced by providing a windowed opaque coating on the sensor array surface, the windows permitting optical energy to reach light sensitive regions of the pixels, and by reducing optical path stray reflection. Further haze-type error reduction is obtained by acquiring values for a plurality (but not necessarily all) of pixel sensors in the TOF system pixel sensor array. Next, a correction term for the value (differential or other) acquired for each pixel in the plurality of pixel sensors is computed and stored. Modeling response may be made dependent upon pixel (row, column) location within the sensor array. During actual TOF system runtime operation, detection data for each pixel, or pixel groups (super pixels) is corrected using the stored data. Good optical system design accounts for correction, enabling a simple correction model.

7 Claims, 6 Drawing Sheets

METHOD AND SYSTEM TO REDUCE STRAY LIGHT REFLECTION ERROR IN TIME-OF-FLIGHT SENSOR ARRAYS

RELATIONSHIP TO PENDING APPLICATIONS

Priority is claimed to co-pending U.S. provisional patent application Ser. No. 61/124,104 filed 11 Apr. 2008, entitled Method and System to Reduce Stray Light Reflection Error in Time-of-Flight Sensor Arrays, and also to co-pending U.S. provisional patent application Ser. No. 61/203,599 filed 26 Dec. 2008 entitled Improvements to Time-of-Flight Sensing. Each of the provisional patent applications is assigned to Canesta, Inc., assignee herein.

FIELD OF THE INVENTION

The present invention relates generally to differential pixel sensor arrays used in time-of-flight (TOF) sensor arrays, and more particularly to reducing the effects of stray light reflection error in TOF systems using such sensor arrays.

BACKGROUND OF THE INVENTION

In many applications it is desired to know the Z-distance to a target object. A relatively accurate class of range or Z distance systems are the so-called time-of-flight (TOF) systems, many of which have been pioneered by Canesta, Inc., assignee herein. Various aspects of TOF imaging systems are described in the following patents assigned to Canesta, Inc.: U.S. Pat. No. 7,203,356 "Subject Segmentation and Tracking Using 3D Sensing Technology for Video Compression in Multimedia Applications", U.S. Pat. No. 6,906,793 "Methods and Devices for Charge Management for Three-Dimensional Sensing", and U.S. Pat. No. 6,580,496 "Systems for CMOS-Compatible Three-Dimensional Image Sensing Using Quantum Efficiency Modulation", U.S. Pat. No. 6,515,740 "Methods for CMOS-Compatible Three-Dimensional image Sensing Using Quantum Efficiency Modulation".

FIG. 1 depicts an exemplary TOF system, as described in U.S. Pat. No. 6,323,942 entitled "CMOS-Compatible Three-Dimensional Image Sensor IC" (2001), which patent is incorporated herein by reference as further background material. TOF system 10 can be implemented on a single IC 110, without moving parts and with relatively few off-chip components. System 100 includes a two-dimensional array 130 of Z pixel detectors 140, each of which has dedicated circuitry 150 for processing detection charge output by the associated detector. In a typical application, pixel array 130 might include 100×100 pixels 140, and thus include 100×100 processing circuits 150. (Sometimes the terms pixel detector, or pixel sensor, or simply sensor are used interchangeably.) IC 110 preferably also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations, which may be output as DATA.

Under control of microprocessor 160, a source of optical energy 120, typical IR or NIR wavelengths, is periodically energized and emits optical energy $S_1$ via lens 125 toward an object target 20. Typically the optical energy is light, for example emitted by a laser diode or LED device 120. Some of the emitted optical energy will be reflected off the surface of target object 20 as reflected energy $S_2$. This reflected energy passes through an aperture field stop and lens, collectively 135, and will fall upon two-dimensional array 130 of pixel detectors 140 where a depth or Z image is formed. In some implementations, each imaging pixel detector 140 captures time-of-flight (TOF) required for optical energy transmitted by emitter 120 to reach target object 20 and be reflected back for detection by two-dimensional sensor array 130. Using this TOF information, distances Z can be determined as part of the DATA signal that can be output elsewhere, as needed.

Emitted optical energy $S_1$ traversing to more distant surface regions of target object 20, e.g., Z3, before being reflected back toward system 100 will define a longer time-of-flight than radiation falling upon and being reflected from a nearer surface portion of the target object (or a closer target object), e.g., at distance Z1. For example the time-of-flight for optical energy to traverse the roundtrip path noted at t1 is given by $t1=2 \cdot Z1/C$, where C is velocity of light. TOF sensor system 10 can acquire three-dimensional images of a target object in real time, simultaneously acquiring both luminosity data (e.g., signal brightness amplitude) and true TOF distance (Z) measurements of a target object or scene. Most of the Z pixel detectors in Canesta-type TOF systems have additive signal properties in that each individual pixel acquires vector data in the form of luminosity information and also in the form of Z distance information. While the system of FIG. 1 can measure Z, the nature of Z detection according to the first described embodiment of the '942 patent does not lend itself to use with the present invention because the Z-pixel detectors do not exhibit a signal additive characteristic. A more useful class of TOF sensor systems whose Z-detection does exhibit a signal additive characteristic are so-called phase-sensing TOF systems. Most current Canesta, Inc. Z-pixel detectors operate with this characteristic.

Many Canesta, Inc. systems determine TOF and construct a depth image by examining relative phase shift between the transmitted light signals $S_1$ having a known phase, and signals $S_2$ reflected from the target object. Exemplary such phase-type TOF systems are described in several U.S. patents assigned to Canesta, Inc., assignee herein, including U.S. Pat. No. 6,515,740 "Methods for CMOS-Compatible Three-Dimensional Imaging Sensing Using Quantum Efficiency Modulation", U.S. Pat. No. 6,906,793 entitled Methods and Devices for Charge Management for Three Dimensional Sensing, U.S. Pat. No. 6,678,039 "Method and System to Enhance Dynamic Range Conversion Useable With CMOS Three-Dimensional Imaging", U.S. Pat. No. 6,587,186 "CMOS-Compatible Three-Dimensional Image Sensing Using Reduced Peak Energy", U.S. Pat. No. 6,580,496 "Systems for CMOS-Compatible Three-Dimensional Image Sensing Using Quantum Efficiency Modulation". Exemplary detector structures useful for TOF systems are described in U.S. Pat. No. 7,352,454 entitled "Methods and Devices for Improved Charge Management for Three-Dimensional and Color Sensing".

FIG. 2A is based upon above-noted U.S. Pat. No. 6,906,793 and depicts an exemplary phase-type TOF system in which phase shift between emitted and detected signals, respectively, $S_1$ and $S_2$ provides a measure of distance Z to target object 20. Under control of microprocessor 160, optical energy source 120 is periodically energized by an exciter 115, and emits output modulated optical energy $S_1=S_{out}=\cos(\omega t)$ having a known phase towards object target 20. Emitter 120 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms).

Some of the emitted optical energy (denoted $S_{out}$) will be reflected (denoted $S_2=S_{in}$) off the surface of target object 20, and will pass through aperture field stop and lens, collectively 135, and will fall upon two-dimensional array 130 of pixel or photodetectors 140. When reflected optical energy $S_{in}$ impinges upon photodetectors 140 in pixel array 130, photons within the photodetectors are released, and converted into tiny amounts of detection current. For ease of explanation, incoming optical energy may be modeled as $S_{in}=A \cdot \cos(\omega \cdot t + \theta)$, where A is a brightness or intensity coefficient, $\omega \cdot t$ represents the periodic modulation frequency, and $\theta$ is phase shift. As distance Z changes, phase shift $\theta$ changes, and FIGS. 2B and 2C depict a phase shift $\theta$ between emitted and detected signals, $S_1$, $S_2$. The phase shift $\theta$ data can be processed to yield desired Z depth information. Within array 130, pixel detection current can be integrated to accumulate a meaningful detection signal, used to form a depth image. In this fashion, TOF system 100 can capture and provide Z depth information at each pixel detector 140 in sensor array 130 for each frame of acquired data.

In preferred embodiments, pixel detection information is captured at at least two discrete phases, preferably 0° and 90°, and is processed to yield Z data.

System 100 yields a phase shift $\theta$ at distance Z due to time-of-flight given by:

$$\theta = 2 \cdot \omega \cdot Z/C = 2 \cdot (2 \cdot \pi \cdot f) \cdot Z/C \quad (1)$$

where C is the speed of light, 300,000 Km/sec. From equation (1) above it follows that distance Z is given by:

$$Z = \theta \cdot C/2 \cdot \omega = \theta \cdot C/(2 \cdot 2 \cdot f \cdot \pi) \quad (2)$$

And when $\theta = 2 \cdot \pi$, the aliasing interval range associated with modulation frequency f is given as:

$$Z_{AIR} = C/(2 \cdot f) \quad (3)$$

In practice, changes in Z produce change in phase shift $\theta$ although eventually the phase shift begins to repeat, e.g., $\theta = \theta + 2 \cdot \pi$, etc. Thus, distance Z is known modulo $2 \cdot \pi \cdot C/2 \cdot \omega) = C/2 \cdot f$, where f is the modulation frequency.

But even with improved TOF systems such as exemplified by FIG. 2A, some portion of incoming optical energy received by a specific pixel 140 within array 130 will in fact be optical energy intended for another pixel within the array. What seems to occur is that within the pixel sensor array, some incoming optical energy reflects off shiny surfaces of the IC structure containing the array, typically reflective polysilicon traces and metal. The undesired result is that incoming optical energy that ideally would be sensed by a single pixel is instead reflected internally and is sensed by many pixels. Such internal reflections contribute to what is termed haze. This haze results from detection output signals being generated by pixels in the array other than the pixel that was intended to directly receive the incoming optical energy. As used herein, the term stray light will be used to refer to such misdirected optical energy, which manifests as a haze. In many applications, the magnitude of stray light is of no cause for concern. But in high performance TOF systems, such parasitic stray light and resultant haze can contribute to substantial measurement error in that wrong values of range Z will result from errors in detected phase-shift.

Thus there is a need for a mechanism to reduce if not substantially eliminate phase-shift errors in phase-type TOF systems due to parasitic stray light error.

The present invention provides mechanisms, implementable in hardware and/or software, to substantially eliminate such stray light error.

SUMMARY OF THE INVENTION

Haze-type phase shift error due to stray light reflections in a TOF system including a phase-type TOF system is reduced in several ways. In practice, with used with Canesta-type differential TOF systems, as described in the referenced U.S. patents, haze seems to result substantially from stray light reflection, with little or no contribution from cross-talk between pixels in the pixel array.

Mechanically, magnitude of the stray light reflections preferably is reduced by reducing surface reflectivity within the IC containing the sensor array. Reflectivity is reduced in some embodiments by coating the uppermost surface of the array structure with black ink or the like, leaving of course unpainted window areas overlying the light sensitive regions of the array. The unpainted window areas preferably are somewhat oversized relative to the underlying light sensitive regions because incoming optical energy may arrive at an angle relative to the plane of the array. Such inking or painting can help reduce stray light reflections and undesired haze.

Other embodiments further reduce the undesired effects of stray light reflections using a software modeling approach that can be used with or instead of the above-noted mechanical approach. After fabrication, the pixel array is subjected to a spatial impulse of optical energy that is directed toward one region of the array. Because stray light reflections will occur, even with an inked windowed upper array surface, more than one pixel will output a detection signal responsive to the input impulse. The brightness or haze signal produced at the non-targeted pixels is measured and an average haze brightness value is determined. In this embodiment, as a corrective measure during actual run time operation of the TOF system and array, an average correction signal based upon the input impulse test is applied to the detection output preferably from each pixel in the array. This simple model has been found to reduce stray light reflections.

In some embodiments, correction data is determined for less than each individual pixel in the array. For example, differential values may be acquired for a plurality (but not necessarily all) pixel sensors in the TOF system pixel sensor array responsive to an input pulse of optical energy. Next, a correction term for the differential value for each pixel in the plurality of pixel sensors is computed, based on the acquired values such that phase-shift error is substantially reduced. In practice, phase-shift error due to stray light reflection can be reduced by as much as a factor of five.

In some embodiments each pixel sensor correction term is computed from a sum of acquired differential values, and in other embodiments, a common or same correction term is used for each of the plurality of pixel sensors. In other embodiments, response from at least some if not from each pixel in the TOF system pixel sensor array is stored in response to an input of pulsed optical energy. The pulsed optical energy is intended to elicit a system pixel sensor array response indicative of light haze. Thus, whereas ideally only the individual pixel that senses the impulse should respond, in practice many if not most pixels in the array will also respond with a signal representing haze. The pulsed response optical energy input may be modeled in the form of an idealized pulse, a pulse having at lease one base pedestal parameter that varies with location, or some combination of each. The response of various, if not all, pixels in the array to the pulsed input is recorded and a correction value is assigned to various pixels in the array, if not to each individual pixel in the array. In this fashion the mal-effects from reflected optical energy within the array are reduced. More sophisticated correction preferably provides array-location-dependent models, in which the amount of haze is a function of pixel detector (row, column) location within the pixel array, as well as the location of the optical energy light falling on the array. Modeling can include variations in pulse response base value. Although one can provide on-chip color filters or micro-lens to further reduce partial reflections the residual partial reflections can still unduly interfere with generation of reliable TOF system data, and should be reduced according to embodiments of the present invention.

Other embodiments further reduce mal-effects of stray radiation by coating otherwise reflective regions of the pixel sensor array with a non-reflective surface, leaving openings or windows for regions intended to pass incoming optical energy to the underlying pixel detectors.

Still other embodiments reducing the effect of reflections in the lens and other elements in the optical path of the TOF system. This preferably includes coating the lens and other transmissive elements with anti reflective coating, and/or by designing the optical path in such that stray reflections do not fall upon the sensor array.

Other features and advantages of the invention will appear from the following description in which the preferred embodiments have been set forth in detail, in conjunction with the accompany drawings.

DETAILED DESCRIPTON OF THE PREFERRED EMBODIMENTS

Figure 3A:
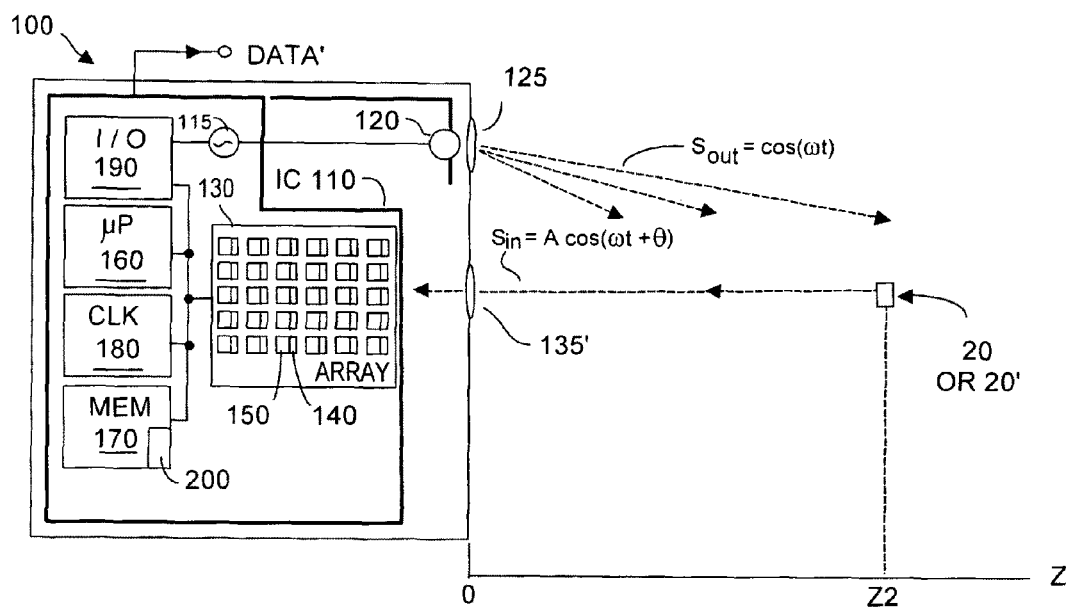
FIG. 3A depicts spatial impulse response data collection with a TOF system, according to embodiments of the present invention.

Referring to FIG. 3A, in a perfect time-of-flight (TOF) system 100, there would be a one-to-one relationship between points on the imaged surface of target object 20 and detector pixels 140 within array 130. But in a practical TOF system, some portion of the optical energy, or light, received at a given pixel within array 130 is actually light intended for another pixel. This amount of misdirected light (termed stray light herein) is usually small and is not a cause for concern. However in high performance TOF systems this parasitic stray light can lead to substantial measurement errors. Although descriptions herein will primarily be given with respect to phase-type differential TOF systems, it is to be understood that haze-type correction can be made to non-phase type TOF systems, according to embodiments of the present invention.

Figure 1:
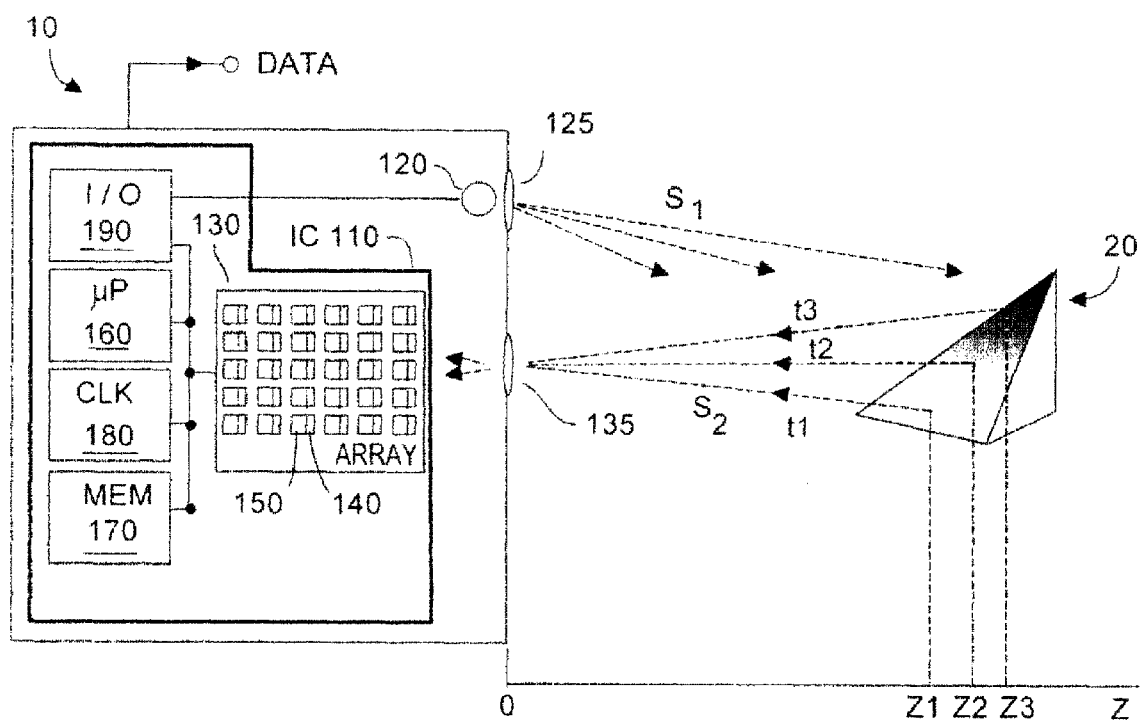
FIG. 1 depicts a time-of-flight (TOF) range finding system, according to the prior art.

Stray light can be due to a number of sources and can have a number of characteristics. Stray light may arise from focus error, and/or haze or reflections in lens 135 in FIG. 1. Accordingly in FIG. 3A (and in FIG. 5), lens 135' has anti-reflective coating(s), As a result, stray light effects that in FIG. 1 would arise from reflections from the lens-facing surface of IC 110, which result in light being reflected back towards lens 135 and then again towards array 130 on IC 110 are reduced, thanks to lens 135'. Such reflection effects can be exacerbated if the pixel structures have a high amount of reflective metal, as is often the case in TOF systems. Reference numeral 100 denotes that TOF system 100 in FIG. 3A (and in FIG. 5) preferably includes a black coating on the surface of the detector IC (see FIG. 4 and 5 for detail), in addition to use of anti-reflective coatings within the optical path between lens 135' and sensor array 130. In addition, TOF system 100 preferably has a well designed optical path such that remaining reflections within the optical path tend to be directed other than toward the sensor array. While such techniques can somewhat reduce reflections, nonetheless high performance TOF systems may still be subject to substantial depth measurement error due to reflections.

Sometimes reflected optical energy from a bright section in the imaged target object contributes to an undesired ghost image. Such mal-effects can generally be reduced by careful control of the reflecting surfaces of lens 135'. For example, flat surfaces within the lens (which may be more complex than depicted in FIG. 3A) can cause ghost images from light reflected off IC 110. However such ghost images can be substantially removed by eliminating such surfaces and by practicing careful optical design. As noted above, reference numeral 135' distinguishes this lens from lens 135 in the prior art system of FIG. 1 in which anti-reflective measures were not included, and TOF system 100 includes careful optical design, to reduce likelihood of reflections falling upon sensor array 130.

However it is extremely difficult to eliminate remaining stray light caused background haze, which haze may or may not be uniformly distributed over the entire pixel sensor array 130. In one embodiment, the present invention recognizes that such haze can usually be modeled as a fraction of the overall optical energy reaching the sensor array, which refraction is redistributed equally amongst all sensor pixels 140 in the array. Using a test set-up such as shown in FIG. 3A, an impulse of light is directed toward a pixel within the pixel array, and the detection signal from each pixel is examined. Ideally only the pixel directly receiving the light impulse should output a detection signal, but internal reflections result in many or not all pixels outputting a detection signal responsive to the light impulse.

Some embodiments of the present invention present a complexly modeled light impulse response, perhaps an impulse formed on a pedestal preferably having at least one variable pedestal parameter, for example pedestal offset, pedestal ripple, pedestal ripple shape, pedestal ripple duration, etc. The individual pixel output detection signals are examined responsive to different input pulses until, perhaps by trial-and-error, a best result is obtained, e.g., minimal haze. A correction signal coefficient can then be defined, either on a per pixel basis, or perhaps on a super-pixel basis, where a super-pixel is defined as a pixel plus neighboring pixels within a predetermined radius of pixels. The correctional signal coefficients preferably are stored within the IC containing the pixel array, perhaps within on-chip memory. Then during actual TOF run-times, the respective correction signal coefficients are applied to each pixel's readout signals. In a sense the embodiments of the present invention form a corrective filter that processes the actual, hazy, responsive of a pixel array, and improves the resultant data using appropriate corrective coefficient data that has been pre-determined and perhaps stored on-chip.

FIG. 3A shows a configuration used to confirm the nature of stray light caused background haze for a pixel array, according to embodiments of the present invention. The function of the configuration of FIG. 3A is to direct an impulse of light to a single pixel 140 (pixel $P_{xy}$) in pixel array 130, and to then examine the effect of this optical energy on other pixels in the array. In one configuration of FIG. 3A, a highly reflective target object 20, e.g., a mirror, is used to reflect back into pixel $P_{xy}$ in sensor array 130 an impulse of light generated by TOF system emitter 120. Alternatively, the target object 20 can be replaced with a small but bright light source 20' whose emitted optical energy ends up focused upon pixel $P_{xy}$ in pixel sensor array 130. In this second configuration, the small but bright light impulse light source 20' eliminates use of TOF system emitter 120 during light impulse data acquisition.

Figure 2A:
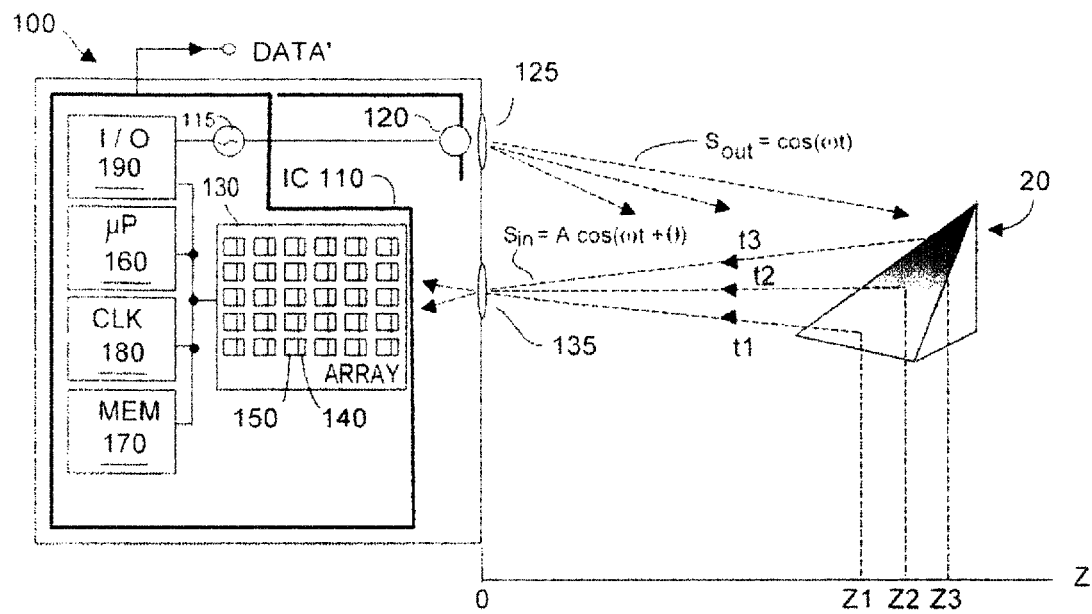
FIG. 2A depicts a phase-based TOF range finding system whose Z-pixels exhibit additive signal properties, according to the prior art.
Figure 2B:
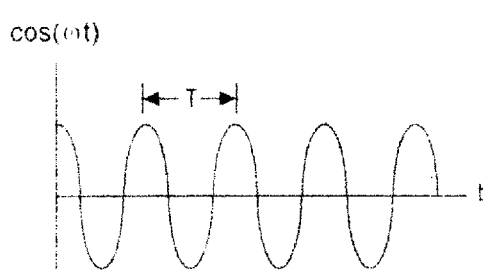
FIGS. 2B and 2C depict phase-shifted signals associated with the TOF range finding system of FIG. 2A, according to the prior art.
Figure 2C:
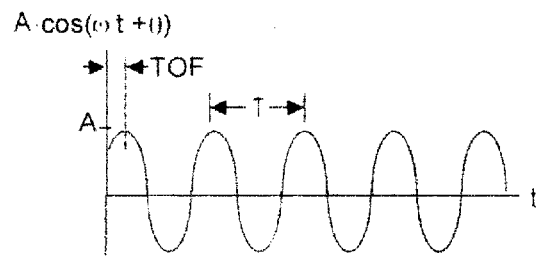
Figure 3B:
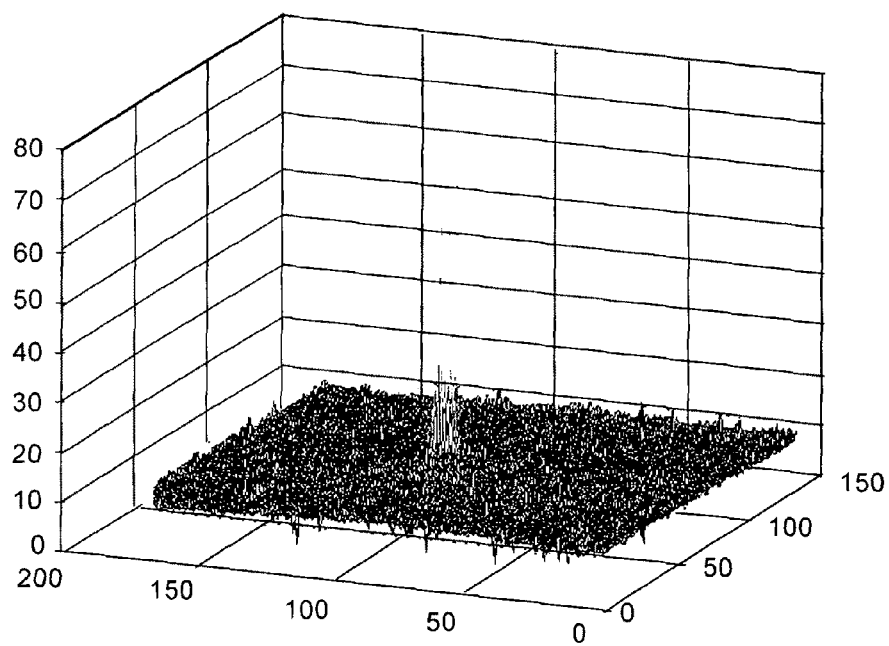
FIG. 3B depicts response across an array of detectors in a TOF system to a spatial impulse of light as depicted in FIG. 3A.
Figure 3C:
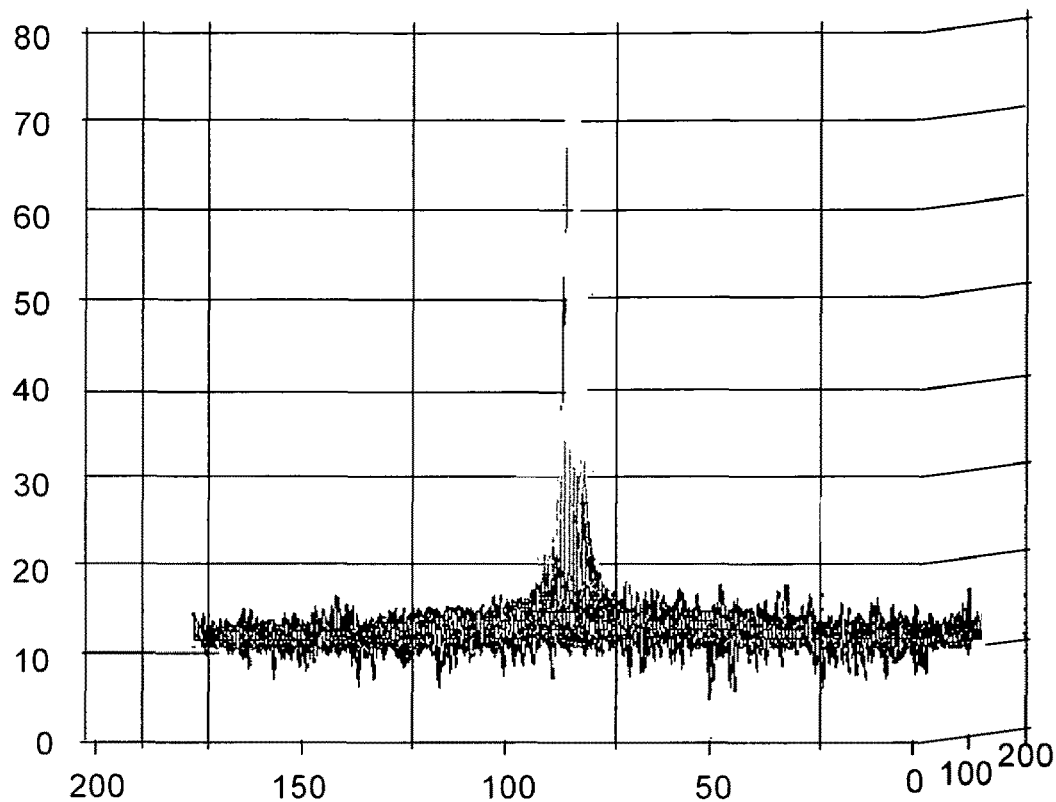
FIG. 3C depicts an elevation plot of the spatial impulse response data shown in FIG. 3B.

FIG. 3B depicts pixel sensor 130 response to the light impulse in the vertical axis, across pixel locations in the x-y plane for an array 130 comprising 150×200 pixels. FIG. 3C is an elevation plot for the same data of FIG. 2B. As seen from the data of FIGS. 3B and 3C, there is a background haze of about 10 counts magnitude throughout the array, plus the 65 count response from the targeted pixel. The background 10 count response is like a haze that is distributed evenly across the pixel array. A similar 10 count haze data would result regardless of at which specific pixel the bright light impulse was directed.

From experimental tests culminating in data exemplified by FIGS. 3B and 3C, it is now known that often a small (and proportionately constant) amount of light intended for a given pixel is diverted and distributed evenly amongst all other pixels in the array of pixels.

Figure 3D:
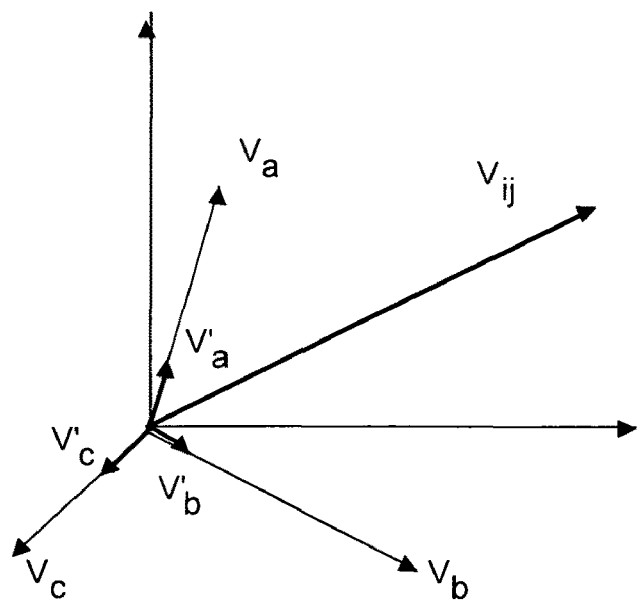
FIG. 3D is a three-dimensional vector representation of phase differential values for a pixel in a detector array, according to an embodiment of the present invention.

FIG. 3D depicts a practical application of the above test observations on the measured phase vector $V_{xy}$ of a TOF pixel $P_{xy}$ in pixel sensor array 130 in FIG. 3A. FIG. 3D also depicts vectors $V_a$, $V_b$, $V_c$ for pixels $P_a$, $P_b$, $P_c$. Let K represent the fraction of optical energy falling on a given pixel such that Vector $V'_a = KV_a$, $V'_b = KV_b$, and $V'_c = KV_c$. From observation of FIGS. 3B and 3C, the fraction of light from pixels $P_a$, $P_b$ and $P_c$ that falls on a pixel $P_{xy}$ (that is not $P_a$, $P_b$, $P_c$) is $V'_a + V'_b + V'_c = K(V_a + V_b + V_c)$. To generalize, the contribution E to the phase vector from optical energy (or light) intended for other pixels is represented as:

$$\vec{E} = K \sum_{ij} \vec{V}_{ij} \quad (1)$$

The correct value of the phase vector for pixel $P_{xy}$ is then represented as:

$$\hat{V}_{xy} = \vec{V}_{xy} - \vec{E} \quad (2)$$

Note that the correction vector E is independent of pixel $P_{xy}$. Equation (2) may now be rewritten as $$\hat{X}_{xy} = X_{xy} - E_x \quad (3)$$
$$\hat{Y}_{xy} = Y_{xy} - E_y$$

where $$\hat{X}_{xy} = X_{xy} - E_x = X_{xy} - \sum_{ij} X_{ij} \quad (4)$$
$$\hat{Y}_{xy} = Y_{xy} - E_y = \hat{Y}_{ij} - \sum_{ij} Y_{ij}$$

The values of $X_{xy}$ and $Y_{xy}$ represent the 0° and 90° phase differential values for pixel $P_{xy}$. In practice, implementing a method per equations (1), (2), (3), and (4) involves first acquiring the differential values for the pixel detectors in the sensor array of a TOF system. Next, on a per-pixel basis, one computes a correction term for the differential value based on the acquired values, such that mal-effects of stray light reflection are substantially reduced. The correction data may be stored in memory, e.g., memory 170, perhaps as a look-up-table 200. In practice, detected phase shift error due to reflection is reduced by a factor of five. An exemplary such model is described with respect to FIGS. 3E-3I. Preferable optical system 135' is designed so as to make any produced haze obey this simple model, e.g., as depicted in FIGS. 3B and 3C.

Figure 3E:
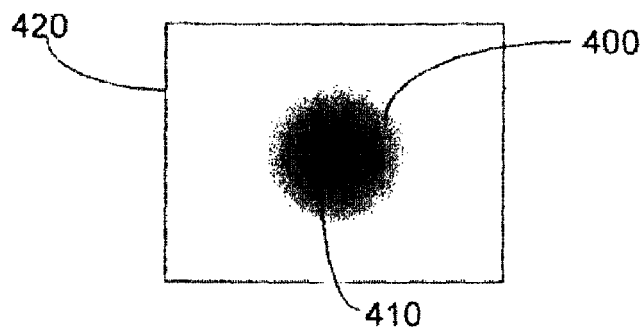
FIG. 3E depicts stray light reflection haze, as addressed by embodiments of the present invention.
Figure 3F:
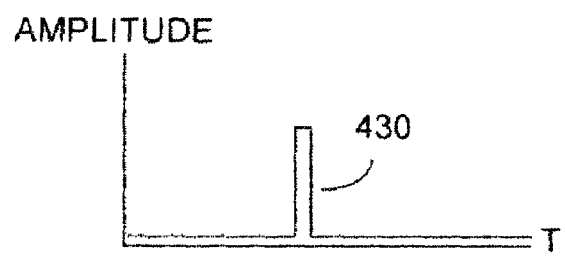
FIGS. 3F-3I depict exemplary models of responses to optical energy spatial impulses with which to acquire and store haze-reducing data, according to embodiments of the present invention.

FIG. 3E depicts the manifestation of internal partial reflections as a haze 400 surround a bright or highly reflective spot 410 on the acquired image 420. Portions of this undesired haze are found over the entire acquired image. Left uncorrected, this haze produces errors in radial Z distances in DATA' in phase-based TOF systems, e.g., FIG. 3A and FIG. 5. In some embodiments, a simple stationary impulse function model, e.g., 430 in FIG. 3F, is used to synthesize the haze, by directing such an impulse of optical energy toward array 130 and examining detection output signals from the various pixels 140. In some models, within the width of the impulse an impulse value is assigned, and elsewhere a constant pedestal value is assigned. This simple impulse model is stationary in that it has a constant value everywhere other than during the impulse time. Pixel haze values responsive to the input pulse are stored, e.g., in memory 170, perhaps in memory region 200, and are used during actual TOF system run-time to make corrections to pixel output values.

Haze-type phase shift error due to stray light reflections in a phase-type TOF system can be reduced by acquiring and storing differential values for a plurality (but not necessarily all) pixel sensors in TOF system pixel array 130 or 130'. Next, a correction term for the differential value for each pixel in the plurality of pixel sensors is computed, based on the acquired values such that phase-shift error is substantially reduced. In some embodiments each pixel sensor correction term is computed from a sum of acquired differential values, and in other embodiments, a common or same correction term is used for each of the plurality of pixel sensors. As noted, ever this simple model can reduce haze due to partial reflection by a factor of perhaps five.

However to obtain reduction of partial reflection haze, above and beyond an improvement factor of perhaps five, embodiments of the present invention provide more sophisticated modeling. According to embodiments of the present invention, more sophisticated modeling includes providing a location-dependent model, where the amount of haze depends upon pixel detector location within the pixel array, as well as location of the haze generating impulses. Further, the model can now have more advanced structure, e.g., rather than a constant pedestal value, a model 440 with a ripple pedestal 450 as shown by FIG. 3G.

Figure 3G:
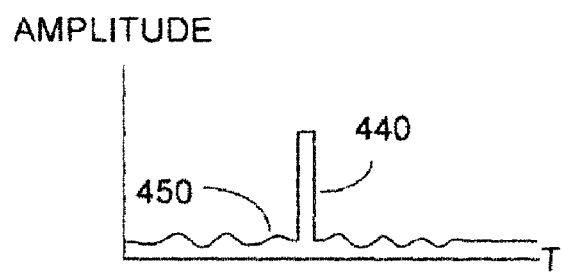

In one embodiment of the present invention, pixel array 130 or 130' is subjected to an impulse of light whose response is shaped for example as shown in FIG. 3G. The light impulse is preferably presented to each pixel 140$_{(r,c)}$ in the array, one pixel at a time, e.g., in row r=1, first illuminating the pixel in column 1, pixel 140$_{(1,1)}$ and recording the detection output signal from each pixel in the entire array, then illumining say the pixel 140$_{(1,2)}$ and recording the detection output signal from each pixel in the entire array, and so on. Of course one could present the light impulse to the pixel array in a sequence other than row 1, col. 1, row 1, col. 2, and indeed one could present more than one light impulse simultaneously to different pixels in the array. In addition, one could present a light impulse to several adjacent pixels simultaneously, to define a super pixel, and then record the response of the array to such input optical energy stimulation.

In an ideal array, when pixel 140$_{(1,1)}$ is subjected to the light impulse, only this pixel should output a detection signal. But as noted, in the real world haze from the illumination affecting pixel 140$_{(1,1)}$ will affect other pixels in array 130 or 130' as suggested by FIG. 3E. By recording data across the pixel array responsive to a light impulse input to a given pixel, a correction map or look-up-table 200 of data can be generated and stored, perhaps within on-chip memory 170 (see FIG. 3A and FIG. 5). This stored data is then used during real-time operation of TOF system 100 to suppress or correct for internal reflection haze. Experimentation as to the structuring or shaping of the light impulse 440 can eventually yield a well-shaped light impulse with which to collect good haze correction data. Those skilled in the art will appreciate that compression methods may be used to reduce the computation, storage, and data collection effort used with the present invention.

Figure 3H:
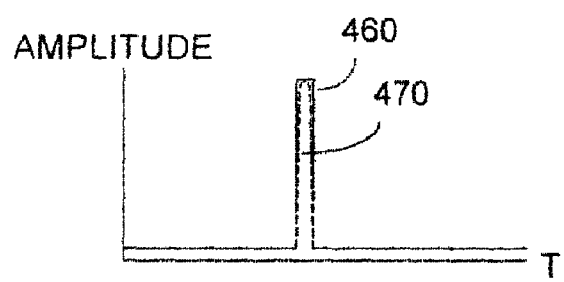
Figure 3I:
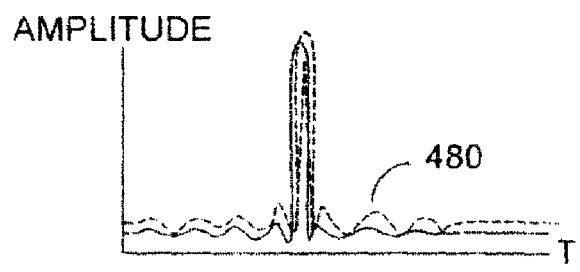

FIGS. 3H and 3I depict generically further exemplary modeling options. As shown in phantom, an input pulse response 470 of optical energy may have varied rise and/or fall times relative to a more idealized pulse 470. As shown by FIG. 3I, such shapes may also have complex pedestal features 180. Again, the intent is, during testing, to arrive at a well designed and shaped input pulse of optical energy with which to measure haze across the pixel array. Thus, haze data collected responsive to a well shaped light impulse should produce a correction table 200 that can reduce the haze contribution greater than a factor of five, preferably by a larger factor, perhaps a factor of about 20 to about 25 times. DATA' generated with such haze reduction will be more reliably accurate than if no haze correction measures were employed to combat partial reflection error.

In a commercial TOF system 100, constraints relating to memory storage, computational overhead, and runtime can make it generally impractical to employ a haze correction model that represents the impulse response from each and every pixel detector 140 in sensor pixel array 130. Thus, the design challenge is to create and use an impulse function whose structure enables a haze correction model that is compact (in terms of memory and computational constraints) and is efficient at runtime. Preferably such model analytically describes the relevant haze correction term over the entire array of pixel detectors. Such model can perhaps be-derived by curve fitting response data to at least two possible models and then selecting the most appropriate model. As noted, the resultant model is selected both for compactness and run time efficiency. As noted, preferably optical system 135' allows for the simplest and most compact model possible subject to optical systems size and cost constraints.

Figure 4:
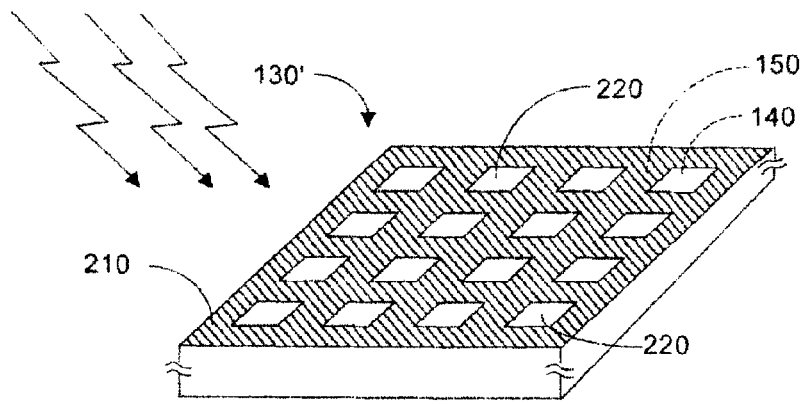
FIG. 4 depicts exemplary mechanical reduction of stray light reflection in a pixel detector array using windowed inking, according to an embodiment of the present invention.
Figure 5:
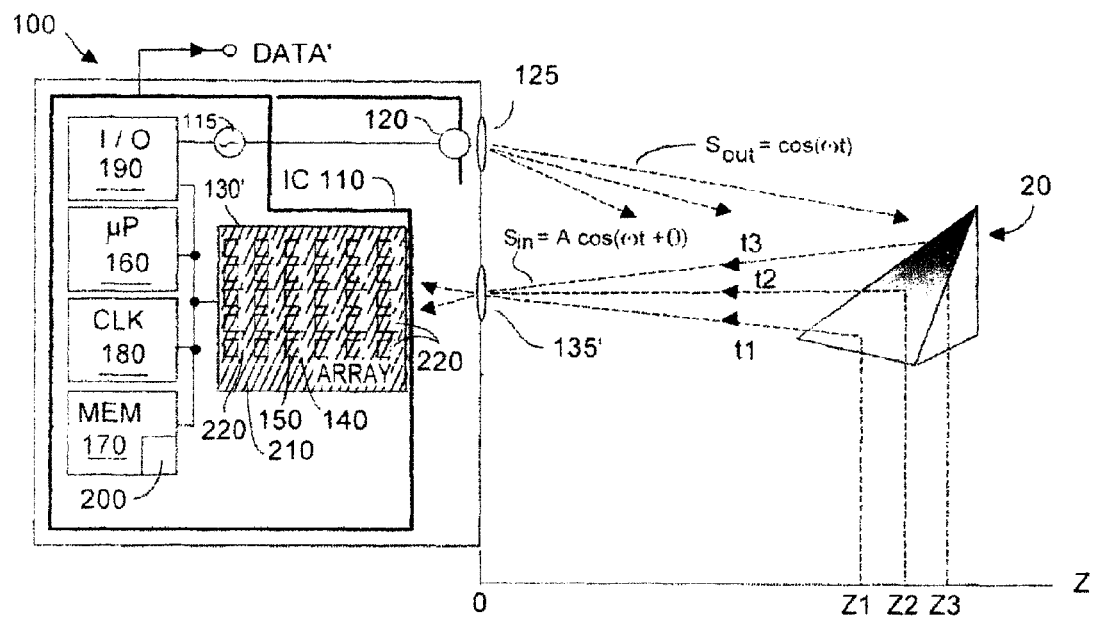
FIG. 5 depicts a phase-shift type TOF range finding system with reduced stray light reflection characteristics, according to embodiments of the present invention.

Referring now to FIG. 4 and FIG. 5, in another embodiment, partial reflections within sensor array 130 due to incoming optical radiation (S$_{IN}$) reflecting off metal polysilicon traces at the upper region of the surface of IC 110 are reduced in phase-based TOF system 100. Some of this undesired reflection is reduced by making the polysilicon traces less reflective, for example by covering the upper surface of the array with a non-reflective coating of black ink or the like, leaving uncovered windows to allow optical energy to reach light sensitive regions of the pixels.

FIG. 4 depicts an exemplary region of an array 130' of pixel detectors 140 and associated circuitry 150, which lie beneath a layer of dark ink or the like 210 formed on the upper surface of the array structure. Defined in this anti-reflective (e.g., black) ink layer 210 are window openings 210, such that an opening 210 overlies and is somewhat larger in area than the light sensitive portion of a pixel 140. Also disposed beneath layer 210 and not shown in FIG. 4 will be the electronic circuitry 150 associated with each pixel 140, as well as various polysilicon traces, metal, etc. Typically the metal layers will have been covered with at least one layer of protective material, e.g., $SiO_2$ and SiN during fabrication. Window openings 210 are intentional oversized somewhat relative to the area of the light sensitive portion of the underlying pixel because incoming optical radiation (shown as zig-zag arrowed lines) may impinge upon the detector array at an angle. But for oversizing, some optical energy might be lost due to shadowing caused by the edge height at the window.

FIG. 5 depicts a phase-shift type TOF system 100 whose memory 170 preferably includes software 200 that when executed, e.g., by microprocessor 160 or other processor resource, carries out reduction of stray light reflection and associated correction to phase-shift error, according to any or all of the embodiments described herein. The pixel array in FIG. 5 is denoted 130' to indicate that preferably (but not necessarily) an anti-reflective black or dark inked or painted coating 210 is formed on the upper surface of the array, defining window areas 220, as described with respect to FIG. 4. Unless otherwise noted, like-referenced elements or components in FIG. 5 to elements or components in FIG. 3A may be the same or identical elements or components.

Modifications and variations may be made to the disclosed embodiments without departing from the subject and spirit of the present invention as defined by the following claims.

What is claimed is:

1. A method for correcting Z distance measurements due to haze in a time of flight (TOF) phase-shift type ranging system comprising:

outputting detection signals from at least some pixel sensors of an array responsive to detecting reflected optical energy including reflections of optical energy emitted from a source of optical energy of the TOF ranging system;

retrieving haze correction values for at least some pixel sensors of the array from a memory;

correcting phase-shift data based on the detection signals from the at least some pixel sensors of the array with haze correction values for the at least some pixel sensors of the array; and determining Z distance measurements based on the phase-shift data corrected with the haze correction values.

2. The method of claim 1 wherein each haze correction value is assigned to a respective pixel sensor based on a location of the respective pixel sensor in the array.

3. The method of claim 1 wherein each haze correction value is a constant correction term used for all corrected pixel sensors.

4. The method of claim 1 further comprising generating the haze correction values by
- subjecting at least one pixel sensor in the array to an impulse of optical energy;
- generating a response value for a plurality of pixel sensors in the array to said impulse;
- computing each haze correction value based on the respective response value for each pixel sensor of the plurality; and
- storing the haze correction values.

5. The method of claim 4, wherein computing each haze correction value based on the respective response value for each pixel sensor of the plurality further comprises computing each haze correction value based on a sum of response values.

6. The method of claim 4, wherein computing each haze correction value based on the respective response value for each pixel sensor of the plurality further comprises including estimating a differential impact overall phase vector for the array of pixel sensors.

7. The method of claim 1 further comprising generating the haze correction values by
- subjecting at least one pixel sensor in the array to an impulse of optical energy;
- generating a phase differential value for each pixel sensor in the array to said impulse at each of a zero degree phase difference and a ninety degree phase difference;
- computing each haze correction value for each phase differential value on a per-pixel basis; and
- storing the haze correction values.

* * * * *